(12) United States Patent
Etchegoyen et al.

(10) Patent No.: US 8,446,834 B2
(45) Date of Patent: May 21, 2013

(54) TRACEBACK PACKET TRANSPORT PROTOCOL

(75) Inventors: Craig Stephen Etchegoyen, Newport Beach, CA (US); Dono Harjanto, Irvine, CA (US)

(73) Assignee: NetAuthority, Inc., San Francisco, CA (US)

( * ) Notice: Subject to any disclaimer, the term of this patent is extended or adjusted under 35 U.S.C. 154(b) by 0 days.

(21) Appl. No.: 13/279,164

(22) Filed: Oct. 21, 2011

(65) Prior Publication Data

US 2012/0207162 A1    Aug. 16, 2012

Related U.S. Application Data

(60) Provisional application No. 61/443,598, filed on Feb. 16, 2011.

(30) Foreign Application Priority Data

Mar. 31, 2011   (AU) ................................ 2011100349

(51) Int. Cl.
*H04L 12/26* (2006.01)
(52) U.S. Cl.
USPC .............................. 370/248; 370/392; 726/22
(58) Field of Classification Search
None
See application file for complete search history.

(56) References Cited

U.S. PATENT DOCUMENTS

| 4,658,093 A | 4/1987 | Hellman |
| 5,191,611 A | 3/1993 | Lang |
| 5,239,648 A | 8/1993 | Nukui |
| 5,291,598 A | 3/1994 | Grundy |
| 5,490,216 A | 2/1996 | Richardson, III |
| 6,233,567 B1 | 5/2001 | Cohen |
| 6,243,468 B1 | 6/2001 | Pearce et al. |
| 6,681,017 B1 | 1/2004 | Matias et al. |
| 6,868,083 B2 | 3/2005 | Apostolopous et al. |
| 7,032,110 B1 | 4/2006 | Su et al. |
| 7,032,242 B1 | 4/2006 | Grabelsky et al. |
| 7,272,728 B2 | 9/2007 | Pierson et al. |

(Continued)

FOREIGN PATENT DOCUMENTS

| WO | WO 01/09756 | 2/2001 |
| WO | WO 2008/034900 | 3/2008 |
| WO | WO 2008/052310 | 5/2008 |
| WO | WO 2009/076232 | 6/2009 |

OTHER PUBLICATIONS

Johnson et al. "Dynamic Source Routing in Ad Hoc Wireless Networks," Mobile Computing, Kluwer Academic Publishers, 1996.

(Continued)

*Primary Examiner* — Min Jung
(74) *Attorney, Agent, or Firm* — Sean D. Burdick

(57) ABSTRACT

Tokens identifying all of the physical routing devices, i.e., network nodes, through which a packet travels are recorded in a limited amount of space reserved in the header of the packet for such tokens. When insufficient space remains in the header of the packet for all tokens required to identify all physical routing devices through which the packet travels, sequences of multiple tokens are replaced with an abbreviation token representing the sequence. The sequence of tokens represented by an abbreviation token can also be abbreviation tokens, supporting recursive abbreviation of the token sequence in the header of the packet as needed to record the entire route of the packet through the network regardless of the limited space in the header for tracking the route of the packet.

4 Claims, 11 Drawing Sheets

U.S. PATENT DOCUMENTS

| | | | |
|---|---|---|---|
| 7,310,813 | B2 | 12/2007 | Lin et al. |
| 7,506,056 | B2 | 3/2009 | Satish et al. |
| 7,599,303 | B2 * | 10/2009 | Nadeau et al. ............... 370/248 |
| 7,739,401 | B2 | 6/2010 | Goyal |
| 7,818,573 | B2 | 10/2010 | Martin et al. |
| 7,852,861 | B2 | 12/2010 | Wu et al. |
| 2002/0099952 | A1 | 7/2002 | Lambert et al. |
| 2003/0063750 | A1 | 4/2003 | Medvinsky et al. |
| 2003/0070067 | A1 | 4/2003 | Saito |
| 2003/0149777 | A1 | 8/2003 | Adler |
| 2003/0212892 | A1 | 11/2003 | Oishi |
| 2003/0217263 | A1 | 11/2003 | Sakai |
| 2003/0237004 | A1 | 12/2003 | Okamura |
| 2004/0030912 | A1 | 2/2004 | Merkle et al. |
| 2004/0143746 | A1 | 7/2004 | Ligeti et al. |
| 2004/0145773 | A1 | 7/2004 | Oakeson et al. |
| 2004/0187018 | A1 | 9/2004 | Owen et al. |
| 2005/0033957 | A1 | 2/2005 | Enokida |
| 2005/0169271 | A1 | 8/2005 | Janneteau et al. |
| 2005/0187890 | A1 | 8/2005 | Sullivan |
| 2006/0075134 | A1 | 4/2006 | Aalto et al. |
| 2006/0130135 | A1 | 6/2006 | Krstulich et al. |
| 2006/0161914 | A1 | 7/2006 | Morrison et al. |
| 2006/0280207 | A1 | 12/2006 | Guarini et al. |
| 2007/0219917 | A1 | 9/2007 | Liu et al. |
| 2008/0028114 | A1 | 1/2008 | Mun |
| 2008/0049779 | A1 | 2/2008 | Hopmann et al. |
| 2008/0052775 | A1 | 2/2008 | Sandhu et al. |
| 2008/0082813 | A1 | 4/2008 | Chow et al. |
| 2008/0098471 | A1 | 4/2008 | Ooi et al. |
| 2008/0244739 | A1 * | 10/2008 | Liu et al. ...................... 726/22 |
| 2008/0298595 | A1 | 12/2008 | Narayanan et al. |
| 2009/0003600 | A1 | 1/2009 | Chen et al. |
| 2009/0006861 | A1 | 1/2009 | Ven Bemmel |
| 2009/0016264 | A1 | 1/2009 | Hirano et al. |
| 2009/0113088 | A1 | 4/2009 | Illowsky et al. |
| 2009/0158426 | A1 * | 6/2009 | Yoon et al. ...................... 726/22 |
| 2010/0034207 | A1 | 2/2010 | McGrew et al. |
| 2011/0026529 | A1 * | 2/2011 | Majumdar et al. ............ 370/393 |

OTHER PUBLICATIONS

Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Angha et al.; "Securing Transportation Network Infrastructure with Patented Technology of Device Locking—Developed by Uniloc USA", http://www.dkassociates.com/admin/paperfile/ITS%20World%20Paper%20Submissio n_Uniloc%20_2_.pdf; Oct. 24, 2006.

International Search Report and Written Opinion issued to PCT Application No. PCT/US12/42986, on Sep. 18, 2012.

Eisen, Ori, "Catching the Fraudulent Man-in-the-Middle and Man-in-the-Browser," *Network Security*, Apr. 2010, pp. 11-12.

Housley et al., "Internet x.509 Public Key Infracstructure Certificate and CRL Profile," *The Internet Society*, Network Working Group, Sep. 1999, 75 pages. [RFC 2459].

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Ylonen et al., "The Secure Shell (SSH) Authentication Protocol," *Network Working Group*, Jan. 2006, 17 pages. RFC-4252.

Nesi, et al., "A Protection Processor for MPEG-21 Players," In Proceedings of ICME, 2006, pp. 1357-1360.

* cited by examiner

TRACEBACK PACKET TRANSPORT PROTOCOL

This application claims priority pursuant to 35 U.S.C. §119 (e) to U.S. provisional application Ser. No. 61/443,598, filed Feb. 16, 2011, which application is specifically incorporated herein, in its entirety, by reference.

BACKGROUND OF THE INVENTION

1. Field of the Invention

The present invention relates generally to computer networking and, more particularly, to methods of and systems for transporting packets through a network while supporting packet traceback.

2. Description of the Related Art

It is advantageous to trace a particular route by which a packet is transported through a network. However, packets that are transported through networks have fixed lengths while the number of hops each packet can take through a network vary widely. Allocating insufficient space to record the route of a packet within the packet defeats proper tracing of the route. Often, there are no limits on the number of hops a packet can take through a network and so there is no amount of space that can be reserved in a packet to guarantee accuracy for route tracing. Even in situations in which the number of hops a packet may take are limited, allocating space to record the maximum packet route in each packet will waste precious bandwidth for all packets taking less than the maximum packet route.

SUMMARY OF THE INVENTION

In accordance with the present invention, tokens identifying all of the physical routing devices, i.e., network nodes, through which a packet travels are recorded in a limited amount of space reserved in the header of the packet for such tokens. When insufficient space remains in the header of the packet for all tokens required to identify all physical routing devices through which the packet travels, sequences of multiple tokens are replaced with a single token representing the sequence.

The single token is sometimes referred to herein as an abbreviation token. The sequence of tokens represented by an abbreviation token can also be composed of abbreviation tokens, supporting recursive abbreviation of the token sequence in the header of the packet as needed to record the entire route of the packet through the network regardless of the limited space in the header for tracking the route of the packet.

To identify the physical nodes through which the packet travels, the tokens are derived from hardware features of each node, much the way a digital fingerprint is derived. Accordingly, identification of the physical nodes through which the packet travels cannot be defeated by spoofing easily reconfigurable attributes such as network addresses.

Various nodes of the network can learn the tokens of adjacent nodes of the network through interior gateway routing protocols such as RIP packets or Hello packets found in OSPF or similar protocols. Nodes can also encrypt the packet for secure hops using the token of the next node as an encryption key.

The abbreviation tokens can be produced in a manner that is consistent throughout all nodes of the network such that expansion of abbreviation tokens to reconstruct the route of the packet can be achieved by any device that knows the abbreviation token generation method.

The abbreviation tokens can also be generated by each node using its own particular method. In such cases, the node that generates an abbreviation token ensures that its own token immediately follows the abbreviation token to thereby identify itself as the node that can properly expand the abbreviation token. To reconstruct the route of a packet through the network, the node generating each abbreviation token is identified and asked to expand the abbreviation token.

Specifically, a first aspect of the present invention accordingly provides a method for routing a packet through a network from a source to a destination, the method comprising: storing data in a header of the packet to represent a complete route of the packet through the network, the data identifying at least one physical routing device of the network through which the packet travels.

In another form, the method further comprises replacing data identifying at least two physical routing devices with a single token in the header of the packet such that the single token identifies the at least two physical routing devices.

In another form, the method further comprises storing data in the header of the packet that identifies a particular physical routing device that performs the replacing.

In another form, the storing is performed by node logic executing within each physical routing device that receives the packet along the route.

In a second aspect, the present invention accordingly provides a method for identifying a particular route taken by a packet through a network, the method comprising:

retrieving one or more tokens from a header of the packet, the tokens collectively identifying one or more physical routing devices through which the packet traveled;

determining that at least a selected one of the tokens represent two or more other tokens; and replacing the selected with the two or more other tokens.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, nodes 108A-I of network 106 transport packets in a manner that records the full route of each packet through network 106 while requiring a relatively small portion of fixed size within each packet for the recording. The route identifies individual, specific ones of nodes 108A-I and not merely IP addresses or other easily configurable or modifiable characteristics of nodes 108A-I.

As described more completely below, each of nodes 108A-I has an identifying token that is unique among tokens of nodes within network 106. The identifier is derived from data specific to each of nodes 108A-I such that the identifier identifies a specific node device. When a packet is routed to any of nodes 108A-I, the receiving node records its token within the packet to thereby record the receiving node as part of the route of the packet. When recorded tokens have filled the limited space of the packet allocated for recording the route, a receiving node replaces multiple tokens in the recorded route with a single token that represents the sequence of replaced tokens, to thereby free space to record additional tokens of the packet's route.

Before describing the recording of a packet's route through network 106 in accordance with the present invention, some elements of node 108A (FIG. 1) are briefly described. Nodes 108A-I are analogous to one another and the following description of node 108A is equally applicable to each of nodes 108B-I except as noted herein.

Figure 2:
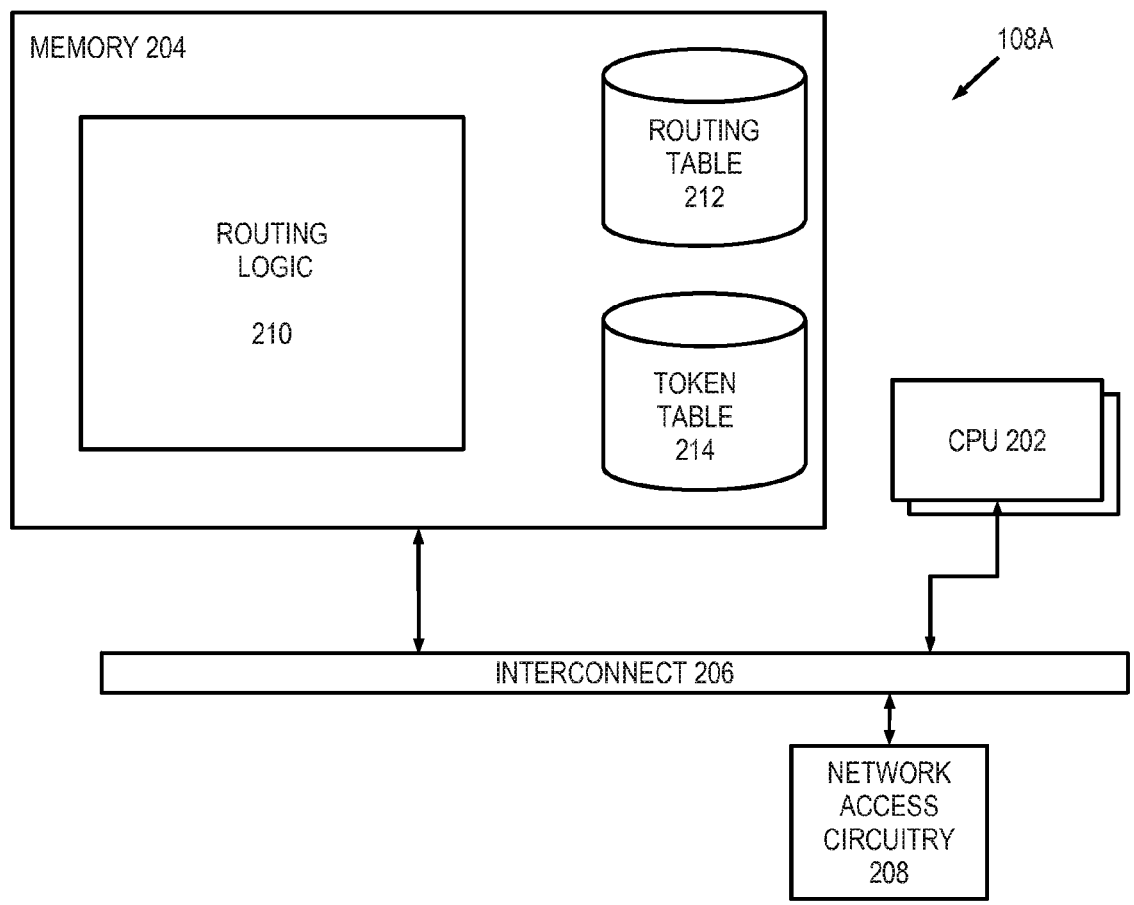
FIG. 2 is a block diagram showing a node of FIG. 1 in greater detail.

Node 108A is shown in greater detail in FIG. 2 and includes one or more microprocessors 202 (collectively referred to as CPU 202) that retrieve data and/or instructions from memory 204 and execute retrieved instructions in a conventional manner. Memory 204 can include generally any computer-readable medium including, for example, persistent memory such as magnetic and/or optical disks, ROM, and PROM and volatile memory such as RAM.

CPU 202 and memory 204 are connected to one another through a conventional interconnect 206, which is a bus in this illustrative embodiment and which connects CPU 202 and memory 204 to network access circuitry 208. Network access circuitry 208 sends and receives data through a network 106 (FIG. 1) and includes ethernet circuitry or fiber optic circuitry in some embodiments.

Node 108A is shown without user input and output, i.e., user-interface devices. While many nodes of a network do not have user-interface devices, some nodes are computers intended to be used by a person and therefore do include user-interface devices.

A number of components of node 108A are stored in memory 204. In particular, routing logic 210 is all or part of one or more computer processes executing within CPU 202 from memory 204 in this illustrative embodiment but can also be implemented using digital logic circuitry. As used herein, "logic" refers to (i) logic implemented as computer instructions and/or data within one or more computer processes and/or (ii) logic implemented in electronic circuitry. Routing table 212 and token table 214 are data stored persistently in memory 204. In this illustrative embodiment, routing table 212 and token table 214 are each organized as a database.

Figure 3:
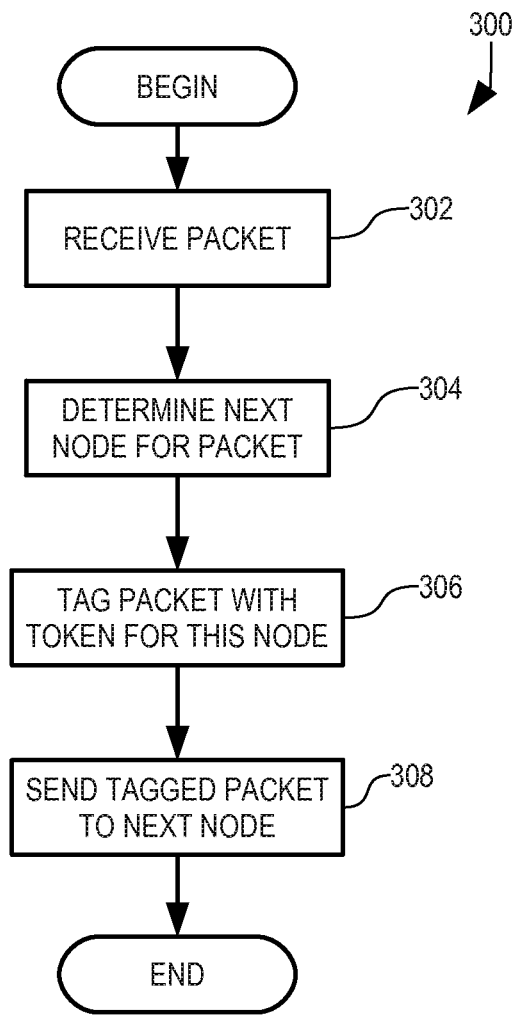
FIG. 3 is a logic flow diagram of the transport of a packet by the node of FIG. 1 in accordance with the present invention.

Logic flow diagram 300 (FIG. 3) illustrates the processing of packets by routing logic 210 of node 108A to thereby transport the packets through network 106. In step 302, routing logic 210 receives the packet through network access circuitry 208 (FIG. 2). In step 304 (FIG. 3), routing logic 210 determines the next node to which the packet should be sent toward the packet's ultimate destination through network 106 by reference to routing table 212 (FIG. 2). Steps 302 (FIG. 3) and 304 are conventional and are known and are not described further herein.

Figure 4:
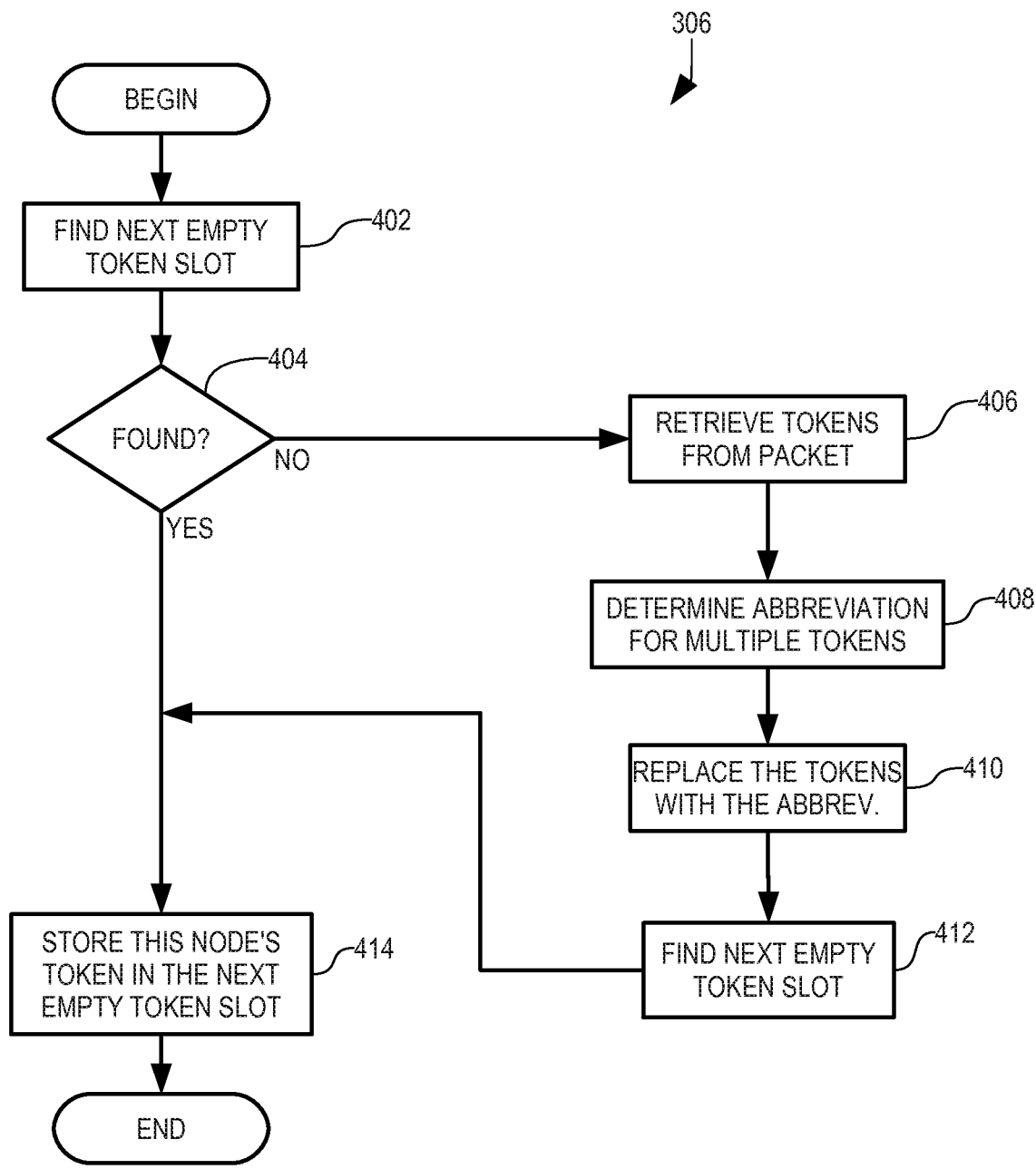
FIG. 4 is a logic flow diagram showing a step of the logic flow diagram of FIG. 3 in greater detail.

In step 306, routing logic 210 tags the packet with the token of node 108A in a manner described more completely below in conjunction with logic flow diagram 306 (FIG. 4). In alternative embodiments, routing logic 210 can tag the packet with the token of the next node determined in step 304 in addition to or instead of tagging the packet with the token of node 108A. In such alternative embodiments, node 108A at least knows the token of each adjacent node among nodes 108A-I and stores all known tokens in routing table 212 (FIG. 2). In embodiments in which nodes 108A-I know each other's tokens, nodes 108A-I inform one another of their tokens in a manner described below during network configuration.

In step 308 (FIG. 3), routing logic 210 sends the packet as tagged to the next node toward the ultimate destination of the packet through network 106. The sending of a packet to a next node is conventional and known and not described further herein. However, in some embodiments in which each of nodes 108A-I knows the tokens of at least its adjacent nodes, the sending node can encrypt payload 706 of the packet for the next node, thereby preventing interception of the packet by an unauthorized node or other nefarious logic that might be injected into either node 108A or the node to which node 108A sends the packet.

Figure 7:
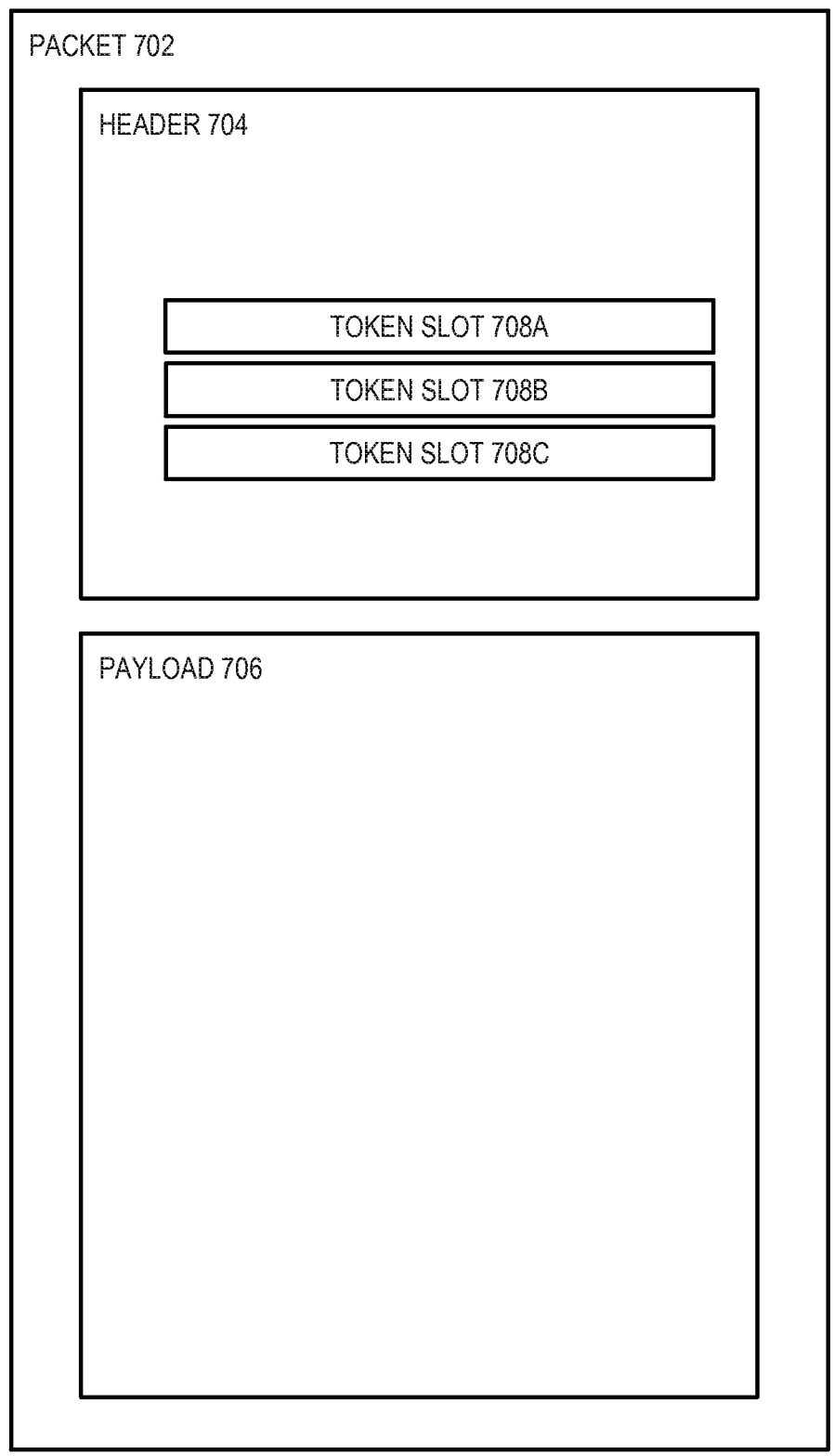
FIG. 7 is a block diagram of a packet that includes a number of token slots in its header in accordance with the present invention.

Logic flow diagram 306 (FIG. 4) shows step 306 in greater detail. In step 402, routing logic 210 finds the first empty token slot of the packet. An example of a packet transported by node 108A is shown as packet 702 (FIG. 7).

Packet 702 includes a header 704 and a payload 706. Payload 706 is that portion of packet 702 that is data intended to be transported through network 106 and is conventional. Header 704 is mostly conventional except that header 704 includes a number of token slots 708A-C, each of which can store a single token. In this illustrative embodiment, each token is 16 octets in length and header 704 can store three (3) tokens, one in each of token slots 708A-C. Of course, tokens can be of different lengths and header 704 can include different numbers of token slots in alternative embodiments.

In this illustrative embodiment, an empty token slot stores all zeros. Accordingly, 16 octets of all zeros is not a valid token. Thus, routing logic 210 finds the first empty token slot by identifying the first of token slots 708A-C that stores all zeros.

In test step 404 (FIG. 4), routing logic 210 determines whether an empty token slot was found in step 402.

If so, processing transfers to step 414 in which routing logic 210 stores the token of node 108A into the first empty token slot of the packet. As noted above, routing logic 210 can store the token of the next node in the first empty slot of the packet, first ensuring that the token of node 108A is stored in the immediately preceding token slot.

Conversely, if routing logic 210 did not find an empty token slot in step 402, processing by routing logic 210 transfers from test step 404 to step 406.

In step 406, routing logic 210 retrieves the tokens from the packet, e.g., retrieves the tokens stored in token slots 708A-C.

Figure 5:
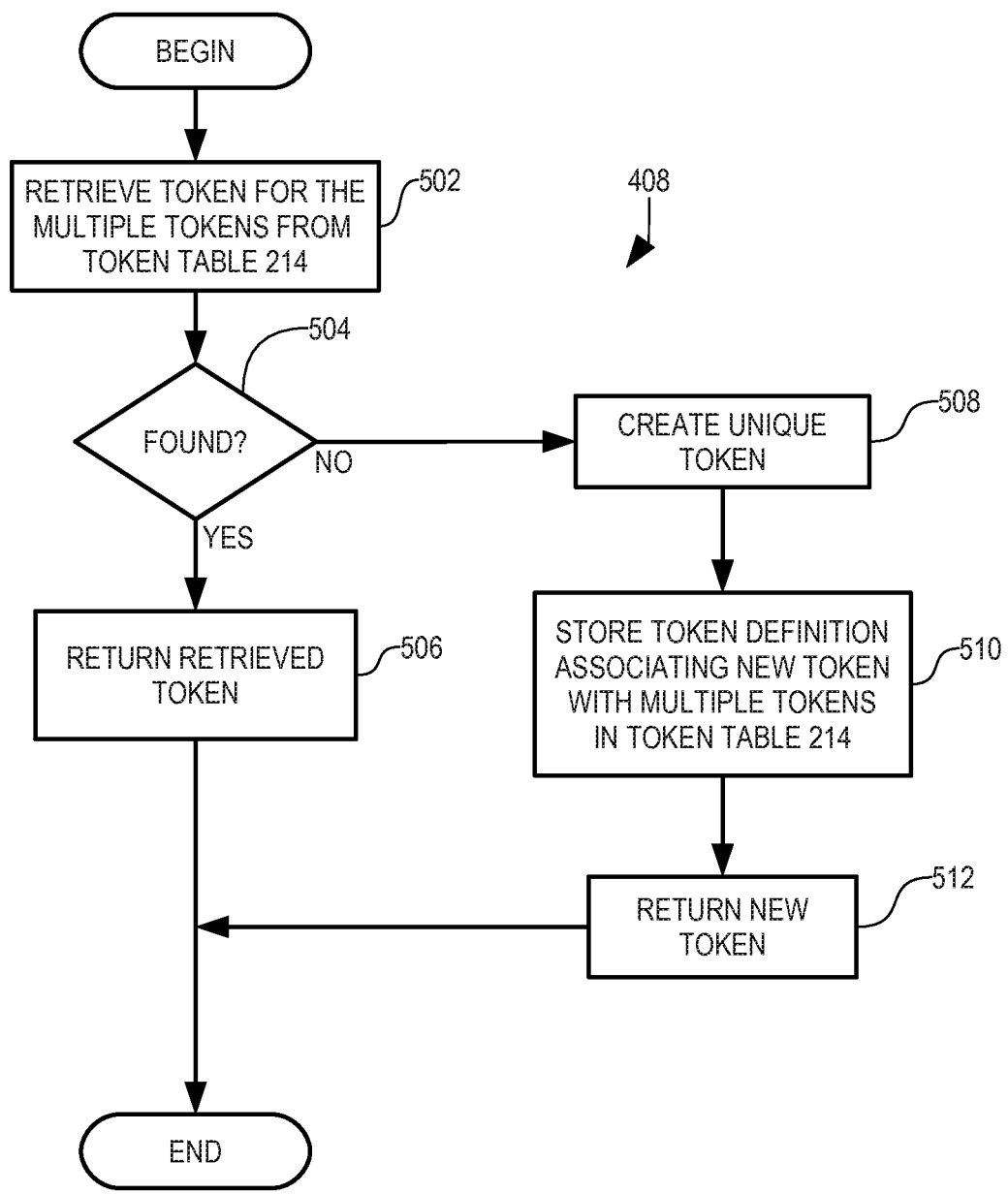
FIG. 5 is a logic flow diagram showing a step of the logic flow diagram of FIG. 4 in greater detail.

In step 408, routing logic 210 determines an abbreviation for a sequence of at least two tokens in a manner described more completely below with respect to logic flow diagram 408 (FIG. 5). The abbreviation is itself a token that is unique among all tokens known to node 108A and all tokens for any nodes of network 106.

In step 410, routing logic 210 replaces the two or more tokens represented by the abbreviation with the abbreviation itself. Since the abbreviation is a single token replacing at least two other tokens, at least one token slot will be freed and therefore empty. Routing logic 210 marks the token slots freed by replacement with the abbreviation as empty by storing all zeros therein.

In step 412, routing logic 210 identifies the first empty token slot after the abbreviation substitution of step 410.

Processing transfers from step 412 to step 414 in which routing logic 210 stores the token of node 108A into the first empty token slot of the packet as described above. After step 414, processing according to logic flow diagram 306 ends, and therefore step 306 (FIG. 3), completes.

Step 408 (FIG. 4) is shown in greater detail as logic flow diagram 408 (FIG. 5).

In step 502, routing logic 210 retrieves, from token table 214 (FIG. 2), an abbreviation token that represents the full sequence of tokens retrieved from token slots 708A-C of the subject packet. In other embodiments, routing logic 210 can also retrieve an abbreviation token that represents a contiguous sub-sequence of the full sequence of retrieved tokens.

Figure 6:
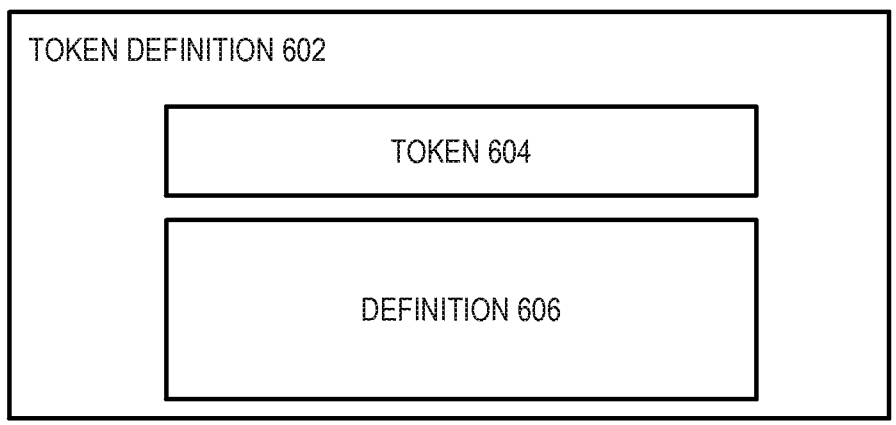
FIG. 6 is a block diagram of a token definition of the token database of FIG. 2 in greater detail.

Token table 214 includes one or more token definitions such as token definition 602 (FIG. 6). Token definition 602 includes a token 604 and a definition 606. Definition 606 is a sequence of two or more tokens. Token 604 is a token that is an abbreviation of the sequence of tokens represented in definition 606.

To identify an abbreviation for a sequence of two or more tokens, routing logic 210 searches token table 214 for a token definition whose definition 606 is that sequence. The corresponding token 604 is the abbreviation.

In test step 504 (FIG. 5), routing logic 210 determines whether an abbreviation was found within token table 214 in step 502. If so, routing logic 210 determines, in step 506, that the retrieved abbreviation is the appropriate abbreviation for the sequence of tokens and processing according to logic flow diagram 408, and therefore step 408 (FIG. 4) completes.

In alternative embodiments, routing logic 210 can use a hashing function to map multiple tokens to a single abbreviation token. In such embodiments, the look-up and test of steps 502 and 504 can be replaced with a single hashing step. In some embodiments, the hashing function is designed to avoid producing hashed tokens that can be confused with a node token. Processing from such a hashing step would transfer to step 506, which is described above.

Returning to logic flow diagram 408 (FIG. 5), if an abbreviation was not found within token table 214 in step 502, processing by routing logic 210 transfers from test step 504 to step 508.

Figure 1:
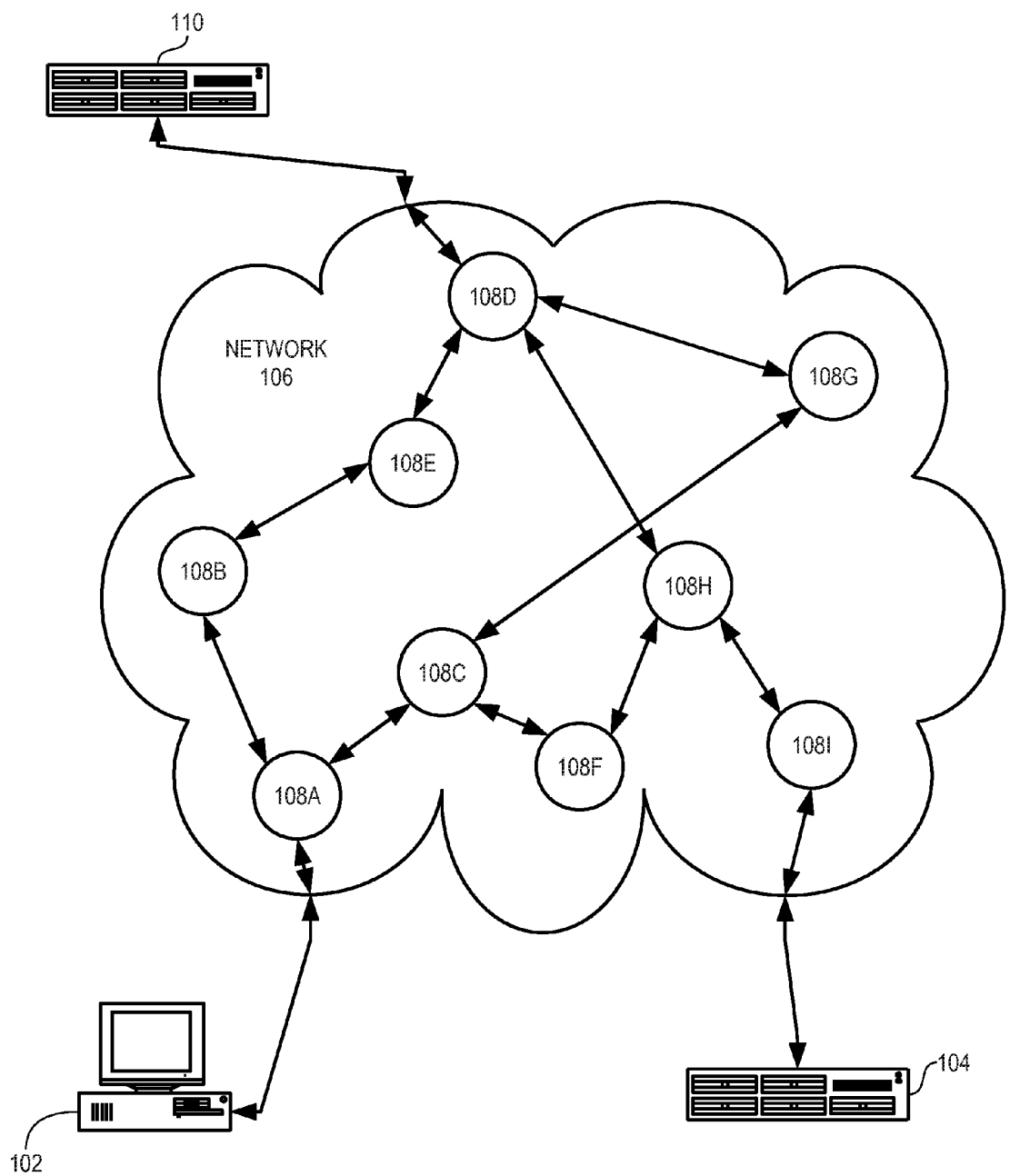
FIG. 1 is a diagram showing computers, including a node manager, connected through a computer network that includes a number of nodes that transport packets in accordance with the present invention.

In step 508, routing logic 210 creates a token that is unique from all abbreviation tokens stored in token table 214 (FIG. 2) and from all tokens of nodes in network 106 (FIG. 1). In this illustrative embodiment, the total range of values for legitimate tokens is divided into a range reserved for nodes of network 106 and a range that each of nodes 108A-I can use in their respective token tables 214. For example, for a token 16 octets in length, all tokens in which the most significant octet is zero can be reserved for tokens of nodes of network 106. That would leave roughly seven times as many tokens for representing sequences of tokens within each node. Similar rules may be applied in other embodiments where the token has a length other than 16 octets. For example, in a system having token lengths of 4 octets, all tokens in which the most significant bit is zero can be reserved for tokens of nodes of network 106, while all other 4-octet tokens may represent token sequences.

Each of nodes 108A-I is informed of the reserved token range during the registration process by which each node is assigned its own token. During system configuration, each of nodes 108A-I registers with node manager 110, identifying itself with a digital fingerprint in this illustrative embodiment. Digital fingerprints are known and are described, e.g., in U.S. Pat. No. 5,490,216 and that description is incorporated herein by reference. In general, a digital fingerprint uniquely identifies the physical device (e.g., a computer or router) based on a sampling of user-configurable and/or non-user-configurable machine parameters readable from the device, wherein each parameter may represent a particular hardware or a software configuration associated with the device.

It should be appreciated that the token created by routing logic 210 in step 508 need not be unique with respect to tokens used by nodes 108B-I in their respective token tables. As a result, routing logic 210 of node 108A need not consult any other node or computer to create an adequately unique new token in step 508, thus avoiding significant delay in transport of the subject packet to its ultimate destination through network 106. However, in such embodiments, routing logic 210 of node 108A should take care to not replace the last token of node 108A with an abbreviation as the last token of node 108A identifies node 108A as the particular one of nodes 108A-I that is capable of reversing the abbreviation. In alternative embodiments, creation of an abbreviation token for multiple other tokens can be performed in a way that is both deterministic and global within nodes 108A-I such that an abbreviation used by any of nodes 108A-I can be properly reversed by any of nodes 108A-I. In these alternative embodiments, routing logic 210 of node 108A can replace the last token of node 108A with an abbreviation.

In step 510, routing logic 210 creates a new token definition that associates the token created in step 508 with the sequence of tokens to be replaced with the new token.

In step 512, routing logic 210 returns the token created in step 508 as the abbreviation token and ends processing according to logic flow diagram 408, and therefore step 408 (FIG. 4) completes.

To illustrate the packet transportation described above, the recording of a route of a packet transported through network 106 (FIG. 1) from computer 102 to computer 104 is described. As shown in FIG. 1, computer 102 connects to network 106 through node 108A. Accordingly, node 108A is the first to process a packet from computer 102.

Figure 8A:
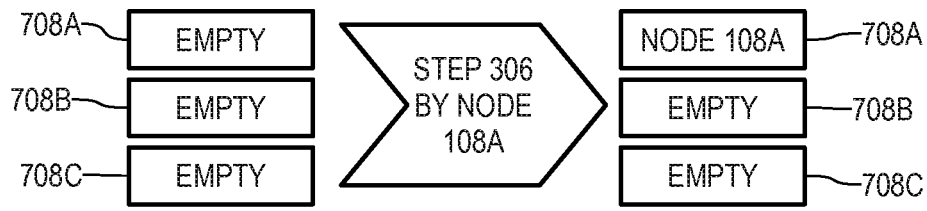
FIGS. 8A-8E are block diagrams illustrating the recording of the route of a packet, including the use of abbreviation tokens.

As shown in FIG. 8A, token slots 708A-C of the packet are initially all empty. Performance of step 306 by node 108A results in node 108A storing its token in the first empty token slot, i.e., in token slot 708A in this illustrative example. Node 108A forwards the packet so tagged to node 108C.

Figure 8B:
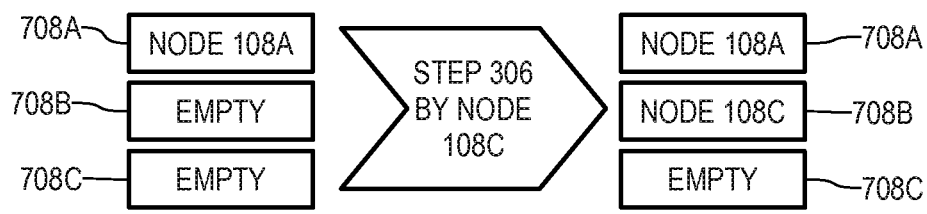

As shown in FIG. 8B, when received by node 108C, token slot 708A stores the token of node 108A and token slots 708B-C of the packet are initially empty. Performance of step 306 by node 108C results in node 108C storing its token in the first empty token slot, i.e., in token slot 708B in this illustrative example. Node 108C forwards the packet so tagged to node 108F.

Figure 8C:
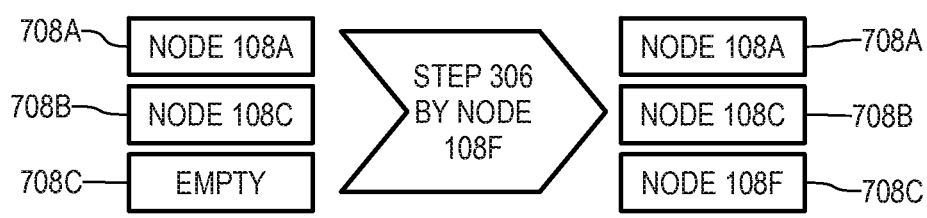

As shown in FIG. 8C, when received by node 108F, token slot 708A stores the token of node 108A, token slot 708B stores the token of node 108C, and token slot 708C is empty. Performance of step 306 by node 108F results in node 108F storing its token in the first empty token slot, i.e., in token slot 708C in this illustrative example. Node 108F forwards the packet so tagged to node 108H.

Figure 8D:
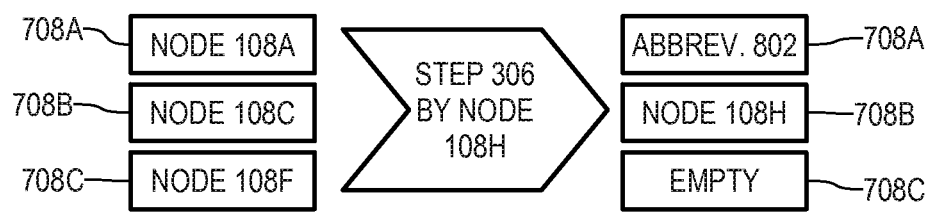

As shown in FIG. 8D, when received by node 108H, token slot 708A stores the token of node 108A, token slot 708B stores the token of node 108C, and token slot 708C stores the token of node 108F. None of token slots 708A-C is empty. Performance of step 306 by node 108H results in (i) replacement of the sequence of tokens for nodes 108A, 108C, and 108F with an abbreviation 802 and (ii) node 108H storing its token in the first empty token slot, i.e., in token slot 708B in this illustrative example. Replacing three (3) tokens with one (1) frees up two token slots in the subject packet. In addition, since the token of node 108H immediately follows abbreviation 802, node 108H is marked as the author of abbreviation 802. Such is used in reconstructing the route of the subject packet in the manner described below. Node 108H forwards the packet so tagged to node 108I.

Figure 8E:
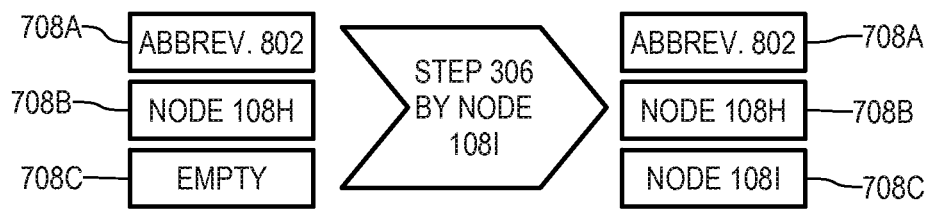

Node 108I processes the packet in an analogous manner and stores its own token in token slot 708C as shown in FIG. 8E. It should be appreciated that another node can replace abbreviation 802, the token of node 108H, and the token of node 108I with another abbreviation token. Node 108I forward the packet tagged with the token of node 108I to computer 104, to thereby effect delivery of the packet to computer 104.

Figure 9:
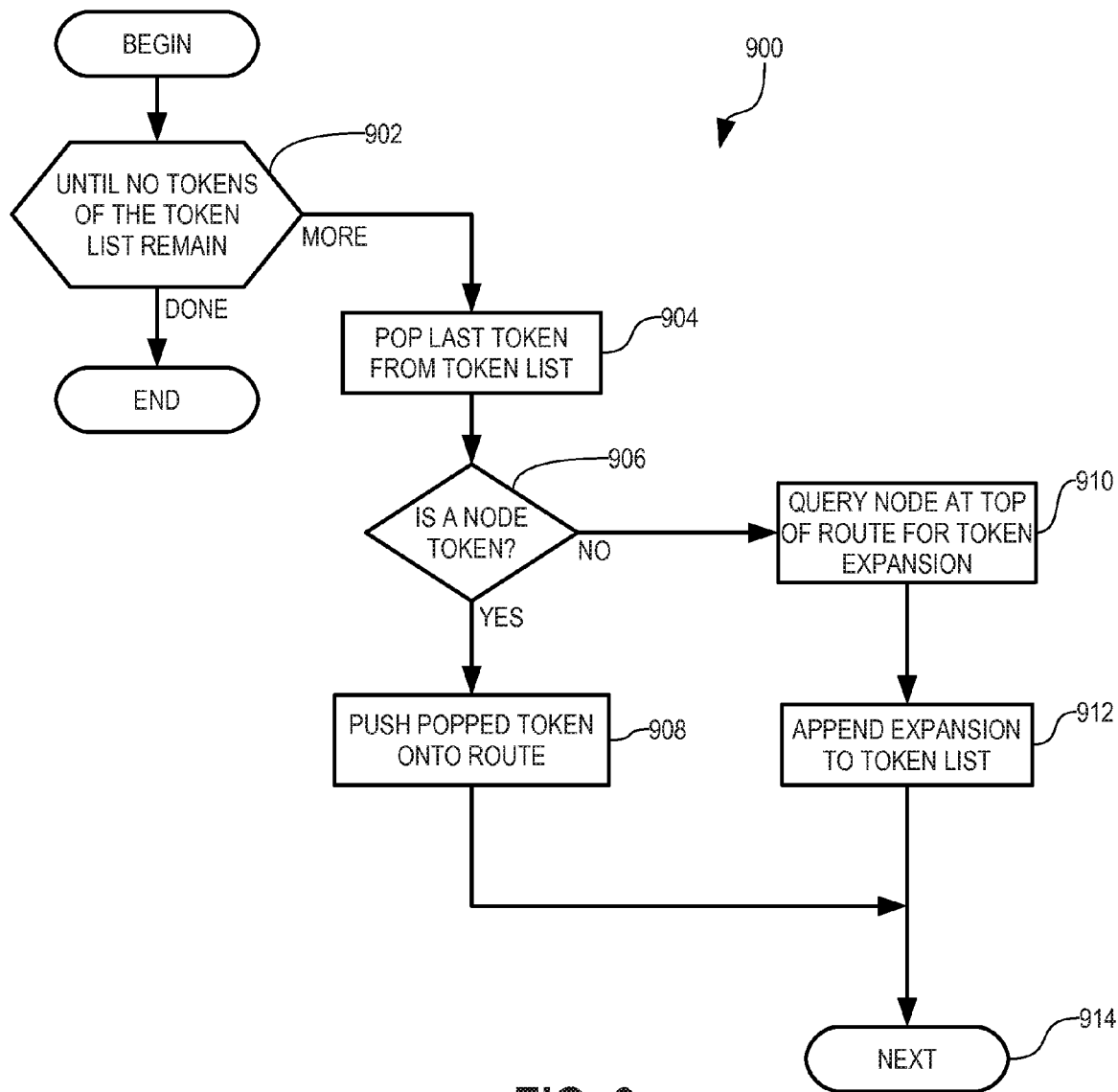
FIG. 9 is a logic flow diagram illustrating the reconstruction of the route taken by a packet through the network of FIG. 1.

Tracing a route taken by a particular packet is illustrated by logic flow diagram 900 (FIG. 9). The steps of logic flow diagram can be performed by logic in any of nodes 108A-I, node manager 110, and computers 102 and 104. For the purposes of current discussion, the logic is referred to as "traceback logic".

Figure 10A:
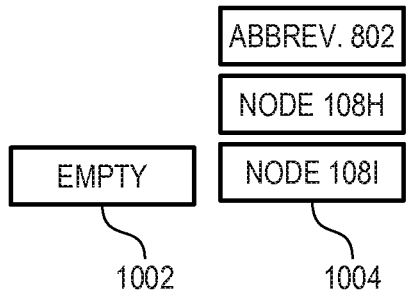
FIGS. 10A-10E are block diagrams illustrating the reconstruction of the route recorded in FIGS. 8A-8E according to the logic flow diagram of FIG. 9.

The traceback logic stores a route 1002 (FIGS. 10A-E) and a token list 1004, both of which are lists of tokens. Initially, route 1002 is empty and token list 1004 includes the tokens stored in token slots 708A-C of the subject packet, as shown in FIG. 10A.

Loop step 902 and next step 914 define a loop in which the traceback logic processes route 1002 and token list 1004 according to steps 904-912 until token list 1004 is empty.

In step 904, the traceback logic pops the last token from token list 1004. As used herein, popping the token from token list 1004 means retrieving the token from the last position in token list 1004 and removing the retrieved token from token list 1004. As shown in FIG. 10A, the last token of token list 1004 identifies node 108I.

In test step 906, the traceback logic determines whether the popped token identifies a node. If so, processing transfers to step 908. Conversely, if the popped token does not identify a node, processing by the traceback logic transfers from test step 906 to step 910.

Figure 10B:
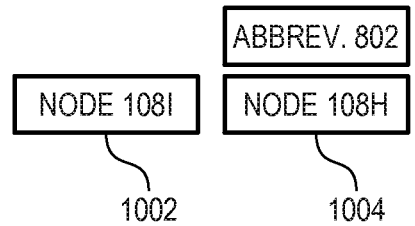

In this illustrative example, the token popped from the last position in token list 1004 is the token of node 108I. Accordingly, processing by the traceback logic transfers to step 908 in which the traceback logic pushes the popped token onto the beginning of route 1002. The result is shown in FIG. 10B in which the token for node 108I is popped from the end of token list 1004 and is pushed on to the beginning of route 1002.

After step 908, processing by the traceback logic transfers to next step 914, in which the loop of steps 902-914 are repeated if token list 1004 is not empty.

In the next iteration of the loop of steps 902-914 in this illustrative example, the traceback logic pops the token of node 108H from the end of token list 1004 and pushes the token on to the beginning of route 1002 in an analogous manner. The result is shown in FIG. 10C.

In the next iteration of the loop of steps 902-914 in this illustrative example, the traceback logic pops abbreviation 802 (FIG. 10C) from the end of token list 1004. In test step 906 (FIG. 9), the traceback logic determines that abbreviation 802 is not a node token and processing of the traceback logic transfers to step 910.

In step 910, the traceback logic queries the node whose token is at the top of route 1002 (FIG. 10C) for expansion of abbreviation 802. It should be appreciated that, in embodiments such as those described above in which an abbreviation is a hash of the multiple tokens and is produced in a manner shared by all of nodes 108A-I, it is unnecessary to query the particular one of nodes 108A-I that stored abbreviation 802 in the packet and step 910 is therefore obviated. However, as described above in some embodiments, each of nodes 108A-I maintains its own token table 214 (FIG. 2) separately and independently of other nodes of network 106. Accordingly, the only node of network 106 that can expand abbreviation 802 in this illustrative embodiment is the node that created abbreviation 802. Since the node that created abbreviation 802 in a performance of step 408 (FIG. 4) stored its own token in the subject packet in step 414, the token immediately following abbreviation 802 identifies the node that authored abbreviation 802.

Figure 10C:
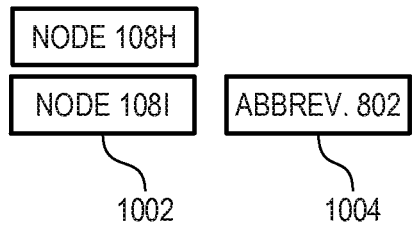

As shown in FIG. 10C, the token of node 108H is at the top of route 1002 and is therefore the node that created abbreviation 802. The traceback logic therefore queries node 108H for expansion of abbreviation 802 in step 910. Each of nodes 108A-I is configured to receive requests for expansion of abbreviation tokens and to respond by returning the sequence of tokens associated with the received abbreviation token within token table 214. In this illustrative example, node 108H responds with the sequence described above, namely, tokens for nodes 108A, 108C, and 108F in order.

Figure 10D:
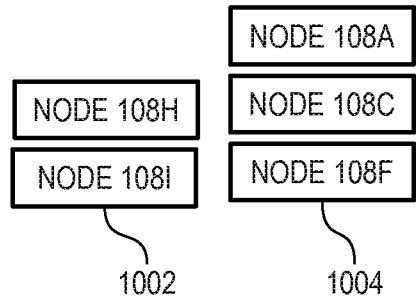

In step 912, the traceback logic appends the token sequence received in step 910 to token list 1004 (FIG. 10D). As shown in FIG. 10D, token list 1004 does not include abbreviation 802 (popped from token list 1004 in step 904) and includes the expansion thereof (appended in step 912). It should be appreciated that the token list resulting from expansion of abbreviation 802 can include other abbreviations, including abbreviations authored by other nodes.

Figure 10E:
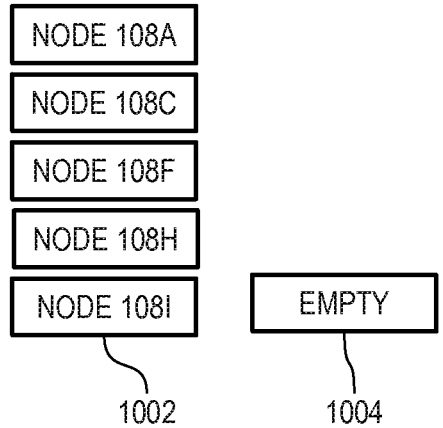

Subsequent iterations of the loop of steps 902-914 (FIG. 9) by the traceback logic result in moving the tokens of nodes 108F, 108C, and 108A from the end of token list 1004 to route 1002 in sequence until token list 1004 is empty, as shown in FIG. 10E.

Thus, in accordance with the present invention, a route of five (5) hops was completely recorded and reconstructed from only three (3) slots available to record nodes to which the packet hopped. Given the recursive nature of the recording of the nodes as described above, i.e., that abbreviations of token sequences can themselves include abbreviations of token sequences that can in turn include abbreviations of token sequences, the length of a packet route through a network that can be traced is unlimited, aside from the practical limitations of the collective capacity of token table 214 of all nodes of the network.

As described above, some embodiments require that each of nodes 108A-I knows all the tokens of at least its adjacent nodes, i.e. those of nodes 108A-I with which data is directly exchanged. Of course, all of nodes 108A-I can know the tokens of all others of nodes 108A-I, but such is not always necessary. For example, since node 108A never directly exchanges data with node 108D, node 108A is not always required to have the token of node 108D.

As described briefly, each of nodes 108A-I receives a token from node manager 110. Node manager 110 derives the token from a digital fingerprint of each node. Thus, the token identifies the particular physical device that acts as a node and not an easily reconfigurable attribute such as a network address.

Nodes 108A-I learn the tokens of others of nodes 108A-I during route configuration. Route configuration involves an exchange of information among nodes 108A-I to build routing table 212. In particular, each of nodes 108A-I builds a routing table such that a given destination address of a packet indicates to which node the packet should be forwarded. Conventional route configuration protocols include RIP (Routing Information Protocol), EIGRP (Enhanced Interior Gateway Routing Protocol), and OSPF (Open Shortest Path First).

In each such route configuration protocol, one or more packets are exchanged between nodes 108A-I to share various elements of information of nodes 108A-I that can be used by each of nodes 108A-I to properly identify a next node in routing a particular packet to its destination. In this illustrative embodiment, nodes 108A-I include their respective tokens assigned by node manager 110 in such route configuration packets, either by including the token as a field in a packet conveying other items of information (such as an additional field in a RIP packet) or as an additional packet such as a Hello packet in EIGRP or OSPF.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for routing a packet through a network from a source to a destination, the method comprising:
   storing data in a header of the packet to represent a complete route of the packet through the network, the data identifying at least one physical routing device of the network through which the packet travels; and
   replacing data identifying at least two physical routing devices with a single token in the header of the packet such that the single token identifies the at least two physical routing devices.

2. The method of claim 1 further comprising:
   storing data in the header of the packet wherein the data identifies a particular physical routing device that performs the replacing.

3. The method of claim 1 wherein the storing is performed by node logic that executes within each physical routing device that receives the packet along the route.

4. A method for identifying a particular route taken by a packet through a network, the method comprising:
   retrieving one or more tokens from a header of the packet, the tokens collectively identifying one or more physical routing devices through which the packet traveled;
   determining that at least a selected one of the tokens represents two or more other tokens; and
   replacing the selected token with the two or more other tokens.

\* \* \* \* \*